3,450,671
POLY-α-OLEFIN COMPOSITIONS CONTAINING DIALKYL - 3,3' - THIODIPROPIONATES AND POLYPHENOLS
Clarence E. Tholstrup, Kingsport, Tenn., assignor to Eastman Kodak Company, Rochester, N.Y., a corporation of New Jersey
No Drawing. Filed Jan. 29, 1960, Ser. No. 5,377
Int. Cl. C08f 45/58
U.S. Cl. 260—45.85          3 Claims

ABSTRACT OF THE DISCLOSURE

Polyolefin compositions stabilized with a dialkyl-3,3'-thiodipropionate and a polyphenol.

---

This invention relates to new poly-α-olefin compositions. Preferred embodiments of the invention relate to polyethylene and polypropylene compositions having improved stability at elevated temperatures to oxidative degradation.

Poly-α-olefins such as polyethylene, polypropylene and the like are commonly subjected to elevated temperatures in the course of their processing into useful items of commerce. Such processing methods as rolling, injection molding, extrusion and the like at elevated temperatures usually result in oxidative degradation of the polymer. In addition, many uses of poly-α-olefins, such as in electrical insulation and the like, often times expose the poly-α-olefin to elevated temperatures. To minimize oxidative deterioration in poly-α-olefins, anti-oxidants or stabilizers are often times incorporated therein.

It is an object of this invention to provide new poly-α-olefin compositions having improved resistance to thermal degradation.

It is another object of this invention to provide new synergistic combinations of stabilibzers for poly-α-olefin compositions.

It is also an object of this invention to provide novel polyethylene and polypropylene compositions containing synergistic combinations of compounds that improve the stability of the polyethylene and polypropylene compositions against deterioration resulting from exposure to elevated temperatures.

Other objects of the invention will be apparent from the description and claims that follow.

The present invention comprises poly-α-olefin compositions having incorporated therein a stabilizer combination of certain diesters of 3,3'-thiodipropionic acid and polyphenols.

The diesters of 3,3'-thiodipropionic acid comprising the present stabilizer combination have the following formula $$S(CH_2CH_2\overset{O}{\underset{\|}{C}}OR)_2$$

wherein R is an alkyl radical having at least 4 and generally 4 to 20 carbon atoms, with 8 to 18 carbon atoms being preferred. A particularly effective ester has twelve carbon atoms for the R substituent, namely, dilauryl-3,3'-thiodipropionate. However, any diester of 3,3'-thiodipropionic acid as described above can be employed in the present stabilizer combination including the butyl, amyl, hexyl, heptyl, octyl, nonyl, decyl, tridecyl, myristyl, pentadecyl, ceptyl, heptadecyl, stearyl, and icosyl diesters of 3,3'-thiodipropionic acid, or mixtures thereof.

A wide variety of polyphenols can be effectively utilized in combination with the described diesters of 3,3'-thiodipropionic acid including those having the following general formula,

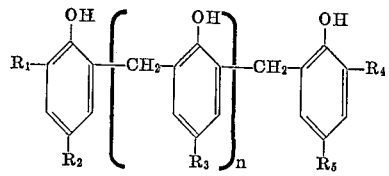

wherein $R_1$, $R_2$, $R_3$, $R_4$ and $R_5$ are alkyl radicals usually having 1 to 12 carbon atoms and preferably 1 to 4 carbon atoms, and $n$ is an integer of 1 to 4 and preferably 1 to 2, $R_1$ and $R_4$ are preferably tertiary alkyl radicals such as tertiary butyl radicals. Other suitable substituents for $R_1$, $R_2$, $R_3$, $R_4$ and $R_5$ include methyl, ethyl, isopropyl, n-butyl, amyl, octyl, decyl, lauryl, stearyl, and related alkyl radicals. Typical polyphenols of the invention include 4-methyl-α,α'-bis(3-tert.-butyl-5-methyl-2-hydroxyphenyl)-2 6-xylenol and $α^2$, $α^{2'}$-methylenebis(2-hydroxy-5-methyl-m-phenylene) bis(6-tert.-butyl-2,4-xylenol). The polyphenols of the invention can be prepared by the method described in Angewandte Chemie, vol. 70, pp. 390–8, July 7, 1958.

The combination of the described diesters of 3,3'-thiodipropionic acid and polyphenols can be used to stabilize a wide variety of solid poly-α-olefin compositions against deterioration resulting from exposure to elevated temperatures. Any of the normally solid polymers of α-monoolefinic aliphatic hydrocarbons containing 2 to 10 carbon atoms can be stabilized in accordance with the invention. The subject stabilizer combinations are preferably used in polyethylene and polypropylene, although such poly-α-olefins as poly(3-methylbutene-1), poly(4-methylpentene-1), poly(pentene-1), poly(3,3-dimethylbutene-1), poly(4,4-dimethylbutene-1), poly(octene-1), poly(decene-1), and the like can also be stabilized with the subject stabilizer combinations. Both the so-called "low density" and "high density" or high crystallinity poly-α-olefin compositions can be stabilized in accordance with the invention. Reference is made to Fawcett et al. U.S. Patent No. 2,153,553 granted Apr. 11, 1939, and to copending applications Coover U.S. Ser. No. 559,536 filed Jan. 17, 1956, now abandoned, and Coover et al. U.S. Ser. No. 724,904 filed Mar. 31, 1958, now abandoned, with regard to the preparation of various poly-α-olefin compositions that can be stabilized against thermal degradation in accordance with the invention. The additive stabilizer combinations of the invention are especially useful for stabilizing the solid resinous poly-α-olefins having average molecular weights of at least 15,000 and more usually at least 20,000, although the stabilizer combinations of the invention can also be utilized to stabilize the so-called poly-α-olefin waxes having lower average molecular weights of usually 3,000 to 12,000.

The amount of the combination of the diester of 3,3'-thiodipropionic acid and the polyphenol employed in poly-α-olefin compositions in accordance with the invention can be widely varied, the stabilizing amount of this combination usually varying with the particular use to which the poly-α-olefin compositions are to be put. Concentrations of at least about .001% of each stabilizer component are suitable, although about .001% to 5% for each stabilizer component are generally used, with about .01% to 3% of the diester of 3,3'-thiodipropionic acid and about .01% to 1% of the polyphenol being preferred, the concentration being based on the weight of the poly-α-olefin. We geneurally utilize the combination of the subject stabilizers at a weight ratio of the diester of 3,3'-thiodipropionic acid to the polyhenol in the range of 1/100 to 100/1, and preferably 1/50 to 50/1.

The stabilizer combination of the invention can be incorpoarted or blended into poly-α-olefin compositions by the conventional methods utilized for blending such materials into resins or plastics. Typical of such methods that can be suitably employed include milling on heated rolls, deposition from solvents, and dry blending. The stabilizers of the invention can be incorporated separately or together into the poly-α-olefin compositions.

The stabilizer combinations of the present invention lend to poly-α-olefin compositions improved stability, and more particularly, improved stability against oxidative deterioration resulting from exposure to elevated temperatures. In addition, poly-α-olefin compositions containing the stabilizer combinations of the invention have enhanced stability against deterioration resulting from exposure to elevated temperatures. In addition, poly-α-olefin compositions containing the stabilizer combinations of the invention have enhanced stability against deterioration resulting from exposure to sunlight or ultraviolet light. Thus, poly-α-olefins stabilized in accordance with the invention have an extended life expectancy and can be used more effectively than unstabilized poly-α-olefins for a wide diversity of uses. Poly-α-olefins stabilized as described can be cast, extruded, rolled or molded into sheets, rods, tubes, pipes, filaments and other shaped articles, including the widely used films of the polymers about .5 to 100 mils in thickness. The present compositions can be used for coating paper, wire, metal, foil, glass fiber fabrics, synthetic and natural textiles or fabrics, and other such materials.

The subject stabilizer combinations of dialkyl esters of 3,3'-thiodipropionic acid and polyphenol are synergistic combinations, namely, the stabilizing effect of such combinations in poly-α-olefins is substantially greater than the additive effect of the individual stabilizers of the combination.

A minor proportionate amount of unesterified 3,3'-thiodipropionic acid can be added to the subject poly-α-olefin compositions to minimize color formation imparted by certain phenols. Usually about .005% to 3%, and preferably about .01% to 1% by weight based on the weight of the poly-α-olefin of 3,3'-thiodipropionic acid is utilized.

The invention is illustrated by the following examples of preferred embodiments thereof. In the following examples the stability of the poly-α-olefins was determined by an oven storage test. The poly-α-olefin under investigation is compression molded into a smooth sheet or plate. The plate is then cut into pieces weighing about 0.25 g. each. The 0.25 g. samples of the molded polymer are then placed in an air oven at 160° C. Samples are removed at intervals and each sample analyzed for peroxides. The oven storage life is the time required for initial peroxide formation in a sample of the polymer. To determine peroxide formation in the oven exposed samples, each 0.25 g. sample in question is dissolved or suspended in 20 ml. of carbon tetrachloride and allowed to digest for 25 minutes. To this is added 20 ml. of a mixture consisting of 60% glacial acetic acid and 40% chloroform, and then 1.0 ml. of a saturated aqueous solution of potassium iodide. The resulting mixture is allowed to react for two minutes, 100 ml. of water is added to dilute the mixture, and then a starch indicator is added. The resulting mixture is then back-titrated with 0.002 N sodium thiosulfate. The peroxide concentration, P, in milliequivalents per kilogram of polymer is given by the expression, $P = 8S$, where $S$ is the number of milliliters of 0.002 N sodium thiosulfate used.

EXAMPLE 1

A typical polyphenol stabilizer component of the invention was prepared as described below. A solution of 18 g. of 2,6-dimethylol-p-cresol and 36 g. of 2-tert.-butyl-p-cresol in 100 ml. of n-hexane was heated with stirring on a steam bath while dry hydrogen chloride was passed into the reaction vessel. The resulting mixture was allowed to react about 3 hours, after which the reaction mixture was cooled and washed with aqueous sodium bicarbonate. The n-hexane solvent was evaporated to a volume of 50 ml. The resulting mixture was chilled and the resulting crystal were recrystallized from a benzene-hexane mixture to give 12 g. of white crystals of the trisphenol, 4-methyl-α,α'-bis(3-tert.-butyl-5-methyl-2-hydroxyphenyl)-2,6-xylenol, melting 158–164° C.

A carbon-hydrogen analysis showed. Calculated: C=80.9%, H=8.70%. Found: C=80.3%, H=8.87%.

EXAMPLE 2

Several samples of powdered polypropylene were mixed with dilauryl-3,3'-thiodipropionate and a polyphenol prepared as described in Example 1, compression molded into plates 1/16 inch in thickness, and the resulting molded samples evaluated with respect to stability by the 160° C. oven storage test described above. The polypropylene was a plastic grade solid polypropylene having an average molecular weight greater than 15,000, a density of about .91 and an inherent viscosity of about 1.46 as determined in tetralin at 145° C. The results of the stability test are summarized by the data set out in Table A below. Samples of the individual components of the stabilizer combinations in the polypropylene, as well as the polypropylene with no additive, were included in the stability test for purposes of comparison. The dilauryl-3,3'-thiodipropionate is indicated in the table as "DLTDP." The concentrations in Table A are based on the weight of the polypropylene.

Table A

| Additive: | Oven life at 160° C., hours |
|---|---|
| None | 2 |
| 0.3% DLTDP | 3 |
| 0.1% polyphenol [1] | 45 |
| 0.1% polyphenol [1] +0.3% DLTDP | 90 |
| 0.2% polyphenol [1] | 100 |
| 0.2% polyphenol [1] +0.3% DLTDP | 175 |

[1] 4 - methyl-α,α'-bis(3-tert.-butyl-5-methyl-2-hyroxyphenyl)-2,6-xylenol.

As can be observed from the data set out in the above table, the subject stabilizer combination gives a stabilizing effect in polypropylene that is greater than the additive effect of the individual components comprising the combination. Similar synergism is demonstrated if plastic grade solid polyethylene having an average molecular weight greater than 15,000, a density of about .91 and a melt index of about 7.59 is substituted for the polypropylene as the poly-α-olefin in the described evaluations.

EXAMPLE 3

Several samples of plastic grade solid polypropylene having an average molecular weight greater than 15,000, a density of about .91 and an inherent viscosity of about 1.74 as determined in tetralin at 145° C. containing stabilizers of the invention were evaluated with respect to stability by the 160° C. oven storage test as described in Example 2 above. Combinations of dilauryl-3,3'-thiodipropionate wtih 4-methyl-α,α'-bis(3-tert.-butyl-5-methyl-2-hydroxyphenyl)-2,6-xylenol and α$^2$,α$^{2'}$-methylenebis(2-hydroxy-5-methyl-m-phenylene)bis(6-tert.-butyl - 2,4-xylenol) were evaluated. The results of the stability test are summarized by the data set out in Table B below. In Table B, dilauryl-3,3'-thiodipropionate is indicated as "DLTDP," 4 - methyl - α,α'-bis(3-tert.-butyl-5-methyl-2-hydroxyphenyl)-2,6-xylenol is indicated as "polyphenol A," and α²,α²'-methylenebis(2-hydroxy-5-methyl-m-phenylene)bis(6-tert.-butyl-2,4-xylenol) is indicated as "polyphenol B." The concentrations in Table B are based on the weight of the polypropylene.

Table B

| Additive: | Oven life at 160° C., hours |
|---|---|
| None | 0.2 |
| 0.1% DLTDP | 1 |
| 0.3% DLTDP | 2 |
| 0.1% polyphenol A | 40 |
| 0.1% DLTDP+0.1% polyphenol A | >120 |
| 0.1% polyphenol B | 50 |
| 0.1% DLTDP+0.1% polyphenol B | >120 |

Similar synergism as that demonstrated above in Table B is demonstrated if plastic grade solid polyethylene having an average molecular weight greater than 15,000, a density of about .91 and a melt index of about 7.59 is substituted for the polypropylene as the poly-α-olefin.

The present invention thus provides novel poly-α-olefin compositions having improved stability against deterioration resulting from exposure to elevated temperatures, and particularly, it provides novel synergistic stabilizer combinations for poly-α-olefin compositions.

Although the invention has been described in detail with reference to preferred embodiments thereof, it will be understood that variations and modifications can be effected within the sipirt and scope of the invention as described hereinabove and as defined by the appended claims.

I claim:
1. A polymeric composition comprising
   (A) a poly-α-olefin derived from α-monoolefinic hydrocarbons having 2 to 10 carbon atoms, and
   (B) a stabilizing amount of a stabilizer combination comprising
       (1) a dialkyl ester of thiodipropionic acid wherein the alkyl moieties each have 4 to 20 carbon atoms, and
       (2) a polyphenol having the following formula

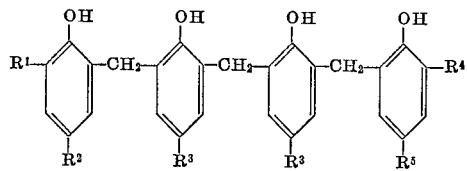

wherein $R^1$, $R^2$, $R^3$, $R^4$ and $R^5$ are alkyl radicals having 1 to 12 carbon atoms.

2. A polymeric composition according to claim 1 wherein said poly-α-olefin is polypropylene.

3. A stabilizer combination comprising
   (A) a dialkyl ester of thiodipropionic acid wherein the alkyl moieties each have 4 to 20 carbon atoms, and
   (B) a polyphenol having the following formula

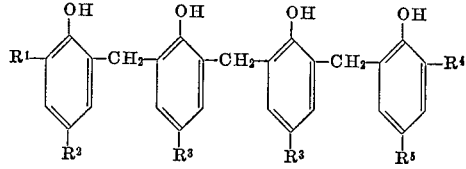

wherein $R^1$, $R^2$, $R^3$, $R^4$ and $R^5$ are alkyl radicals having 1 to 12 carbon atoms.

References Cited

UNITED STATES PATENTS

| 2,519,755 | 8/1950 | Gribbins | 260—45.85 |
| 2,568,902 | 9/1951 | Thompson et al. | 260—45.85 |

FOREIGN PATENTS 758,973  10/1956  Great Britain.

JAMES A. SEIDLECK, *Primary Examiner.*

H. E. TAYLOR, *Assistant Examiner.*

U.S. Cl. X.R.

117—161; 252—404; 260—45.95